(12) United States Patent
Nobukiyo et al.

(10) Patent No.: US 8,179,830 B2
(45) Date of Patent: May 15, 2012

(54) TRANSMISSION CONTROL METHOD AND TRANSMISSION CONTROL DEVICE

(75) Inventors: Takahiro Nobukiyo, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 12/669,171

(22) PCT Filed: Jul. 16, 2008

(86) PCT No.: PCT/JP2008/062789
§ 371 (c)(1),
(2), (4) Date: Jan. 14, 2010

(87) PCT Pub. No.: WO2009/011351
PCT Pub. Date: Jan. 22, 2009

(65) Prior Publication Data
US 2010/0203886 A1    Aug. 12, 2010

(30) Foreign Application Priority Data
Jul. 18, 2007  (JP) .................................. 2007-187021

(51) Int. Cl.
H04H 20/71 (2008.01)
H04L 12/28 (2006.01)
H04L 12/56 (2006.01)

(52) U.S. Cl. ........................................ 370/312; 370/390

(58) Field of Classification Search ................... 370/312, 370/390, 329, 349, 342, 306, 346, 313, 254, 370/315, 328, 310, 347; 455/522.1, 422.1, 455/119, 343, 502, 509, 432.1
See application file for complete search history.

(56) References Cited

U.S. PATENT DOCUMENTS

| | | | | |
|---|---|---|---|---|
| 7,769,010 B2* | 8/2010 | Edlund et al. | | 370/390 |
| 7,852,795 B2* | 12/2010 | Cai | | 370/312 |
| 7,970,002 B2* | 6/2011 | Hu | | 370/432 |
| 2003/0228865 A1* | 12/2003 | Terry | | 455/422.1 |
| 2004/0023672 A1* | 2/2004 | Terry | | 455/458 |
| 2004/0156332 A1* | 8/2004 | Terry et al. | | 370/328 |

(Continued)

FOREIGN PATENT DOCUMENTS

JP    2006013826 A    1/2006

(Continued)

OTHER PUBLICATIONS

International Search Report for PCT/JP2008/062789 mailed Oct. 21, 2008.

*Primary Examiner* — Melody Mehrpour

(57) ABSTRACT

A transmission control device determines cells, each of which has the number of reception users larger than a predetermined value, as a first group and sends data to the first group cells in the point-to-multipoint transmission mode. The transmission control device also determines cells, each of which has a few MBMS reception users and whose neighboring cell is a first group cell, as a second group and sends data to those cells in the point-to-multipoint transmission mode. The transmission control device sends data to other cells in the point-to-point transmission mode. In this way, the transmission control device selects cells to which data is sent in the point-to-multipoint transmission mode and, at the same time, allows a mobile station near the boundary of those cells to acquire a combining effect. Resource consumption amounts and improve coverage rate can be reduced when same data is sent to multiple mobile stations located in multiple cells.

15 Claims, 8 Drawing Sheets

U.S. PATENT DOCUMENTS

| | | | |
|---|---|---|---|
| 2005/0037767 A1* | 2/2005 | Kim et al. | 455/450 |
| 2008/0267109 A1* | 10/2008 | Wang et al. | 370/312 |
| 2009/0023470 A1* | 1/2009 | Fujimoto | 455/552.1 |
| 2009/0180417 A1* | 7/2009 | Frost et al. | 370/312 |
| 2009/0180418 A1* | 7/2009 | Zhang et al. | 370/312 |
| 2009/0285121 A1* | 11/2009 | Tzannes | 370/254 |
| 2011/0032858 A1* | 2/2011 | Lohmar et al. | 370/312 |

FOREIGN PATENT DOCUMENTS

| | | |
|---|---|---|
| JP | 2006135956 A | 5/2006 |
| JP | 2007504721 A | 3/2007 |
| WO | 2006030308 A | 3/2006 |

\* cited by examiner

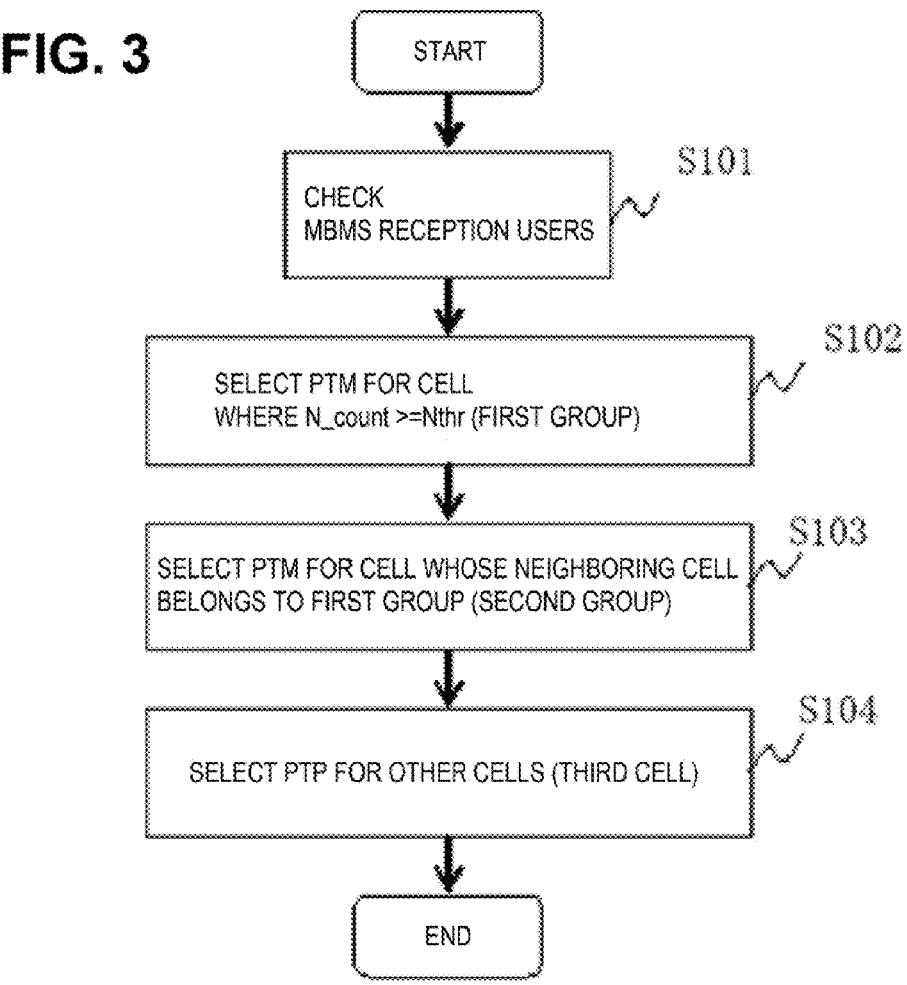
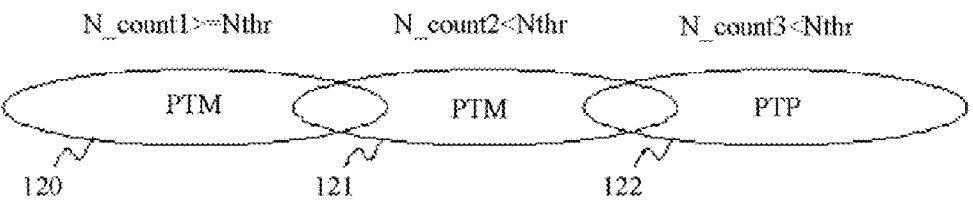

TRANSMISSION CONTROL METHOD AND TRANSMISSION CONTROL DEVICE

CROSS-REFERENCE TO RELATED APPLICATIONS

The present application is the National Phase of PCT/JP2008/062789, filed Jul. 16, 2008, which claims priority from Japanese Patent Application 2007-187021 (filed on Jul. 18, 2007) the content of which is hereby incorporated herein, in its entirety by reference thereto.

TECHNICAL FIELD

The present invention relates to a transmission control method and a transmission control device, and more particularly to a transmission control method and a transmission control device for use in a wireless communication system that sends the same data to multiple mobile stations.

BACKGROUND

3GPP (3rd Generation Partnership Project) has introduced in Release 6 the specification of MBMS (Multimedia Broadcast Multicast Service) as the broadcast function and the multicast function for use in a W-CDMA system.

MBMS, which can send the same data to multiple cells at the same time, provides two data transmission modes, PTM (Point-to-Multipoint) transmission and PTP (Point-to-Point) transmission.

The PTM transmission, a transmission mode in which data is sent to all terminals in a cell via IRL (Radio Link), uses the common channel SCCPCH (Secondary Common Control Physical Channel) that is set in each cell as the physical channel. The PTM transmission, capable of sending data via IRL, can send data using a fixed amount of radio resources regardless of the number of receiving terminals, but requires the transmission power high enough to cover the entire cell. This means that, for terminals near the cell boundary, data is sent at an excessive power level.

On the other hand, the PTP transmission, a transmission mode in which data is sent to one terminal via IRL, uses the high-speed physical downlink common channel HS-PDSCH (High Speed—Physical Downlink Shared Channel) or the individual physical channel DPCH (Downlink Physical Channel) as the physical channel. HS-PDSCH, a data channel used for the high-speed packet transmission method HSDPA (High Speed Downlink Packet Access), uses AMCS (Adaptive Modulation and Coding Schemes) that changes the transmission rate according to the reception quality. This data channel can send at a rate higher than that of DPCH. DPCH uses Inner loop Power Control that changes the transmission power according to the reception quality. Therefore, the PTP transmission can save radio resources per IRL when the reception quality is good, but consumes a high transmission power when there are many MBMS reception users because the total amount of transmission data increases in proportion to the number of MBMS reception users.

When MBMS is performed, the RNC (Radio Network Controller) checks the MBMS reception users and counts the number of MBMS reception users for each cell. This is called "counting".

A cell to which a mobile station is connected to receive MBMS data is called a serving cell. While receiving MBMS data from the serving cell in the PTM transmission mode via SCCPCH, the mobile station obtains a diversity combining gain by receiving the same data at the same time from a neighboring cell in which data is transmitted in the PTM transmission mode. This reception processing is called "combining".

One of the methods for switching the MBMS transmission mode is a first conventional method in which the number of MBMS reception users (N_count) is compared with a pre-set threshold (N_thr) as shown in FIG. 14. In this first conventional method, the transmission mode is determined as follows. In PTP, a higher transmission power is required as the number of MBMS reception users (N_count) is increased. And so, if N_count is equal to or larger than N_thr, the PTM transmission in which data may be sent to all terminals via IRL is performed (see cell 1 in FIG. 14); conversely, if N_count is smaller than N_thr, the PTP transmission in which data is sent to one terminal via IRL is performed (see cells 2 and 3 in FIG. 14).

Patent Document 1 discloses a method in which, because it is known that the power level in the PTM transmission is sometimes unnecessarily high as described above, the PTM transmission is used at a transmission power value that does not cover the entire cell and, at the same time, the PTP transmission is used for a mobile station that is near the cell boundary and has a low channel quality. In this method, when there are mobile stations in all cell boundaries, both the PTM transmission and the PTP transmission are used at the same time in all cells as shown in FIG. 15.

Patent Document 2 discloses a technology that the same multicast data (called "flow" in the document) is sent at the same time to a sector, from which a data reception request is received, and to the sectors which are the sector's neighboring sectors belonging to the same SHOG (Soft Hand Off Group).

Patent Document 1:
Japanese Patent Kokai Publication No. JP2006-135956A
Patent Document 2:
Japanese Patent Kokai Publication No. JP2006-13826A

SUMMARY

However, the conventional transmission mode switching methods described above have the following problems.

A first problem is that, in the first conventional method, the MBMS service coverage rate is decreased near the boundary of a PTM transmission cell (cell 1 in FIG. 14) whose neighboring cell is a PTP transmission cell. The reason is that the combining effect cannot be achieved near the boundary of a cell whose neighboring cell is a PTP transmission cell.

The technology described in Patent Document 1 is not only inefficient because the PTM transmission is performed in all cells but also makes it difficult to achieve the combining effect. In addition, an increase in the number of mobile stations near the boundary of a cell, to which data is sent in the PTP transmission mode, results in an increase in the resource consumption amount, sometimes resulting in a decrease in the resource usage efficiency.

The technology described in Patent Document 2 sometimes results in the PTM transmission being performed for a sector and its neighboring sectors where the number of MBMS reception user is fewer than a predetermined number and so PTP is more suitable. This means that the method described in Patent Document 2, if used, may decrease the resource usage efficiency.

In view of the foregoing, it is an object of the present invention to provide a transmission control method and a transmission control device that can guarantee a predetermined service coverage rate and resource usage efficiency even in a case where the same data is sent to multiple mobile stations when the number of reception users (mobile stations) varies.

According to a first aspect of the present invention, there is provided a transmission control device for use in a wireless communication system described below that selects at least one of the point-to-multipoint transmission and the point-to-point transmission and sends the same data to multiple mobile stations located in a particular cell. That is, this transmission control device comprises a counting unit that counts the number of mobile stations to which data is sent in each cell; a selecting unit that determines cells belonging to a first group and cells belonging to a second group, selects the point-to-multipoint transmission for the cells belonging to the first and second groups, and selects the point-to-point transmission for other cells wherein each of the first group cells has the number of counted mobile stations larger than a predetermined value and each of the second group cells has the number of counted mobile stations smaller than the predetermined value and is the neighboring cell of a cell belonging to the first group; and a sending unit that sends the same data to a plurality of mobile stations located in each of the cells using the transmission mode selected for each of the cells.

According to a second aspect of the present invention, there is provided a transmission control device that controls a plurality of base stations, each of which controls the plurality of cells, and functions as a base station control device.

According to a third aspect of the present invention, there is provided a transmission control method for use in a wireless communication system that selects at least one of the point-to-multipoint transmission and the point-to-point transmission and sends the same data to multiple mobile stations located in a particular cell. According to this method, the transmission control device provided in the wireless communication system first counts the number of mobile stations to which data is sent in each cell. Next, the transmission control device determines cells belonging to a first group and cells belonging to a second group, wherein each of the first group cells has the number of counted mobile stations larger than a predetermined value and each of the second group cells has the number of counted mobile stations smaller than the predetermined value and is a neighboring cell of a cell belonging to the first group. And, the point-to-multipoint transmission is selected for the cells belonging to the first and second groups, and the point-to-point transmission is selected for other cells.

The meritorious effects of the present invention are summarized as follows.

The present invention reduces the resource consumption amount and improves the service coverage rate. The reason is that the transmission control device of the present invention is configured in such a way that one of the point-to-multipoint transmission and the point-to-point transmission, whichever is better in terms of resource usage efficiency in the cell, may be selected depending upon the number of mobile stations to which data is sent and, at the same time, a combining effect is achieved near the boundary of a cell where the point-to-multipoint transmission is determined to be better.

BRIEF DESCRIPTION OF THE DRAWINGS

FIG. 3 is a flowchart showing the operation procedure performed by a base station control device in a first exemplary embodiment of the present invention to select the transmission modes of cells.

FIG. 4 is a diagram schematically showing cells for which the PTM transmission is selected, and a cell for which the PTP transmission is selected, by the base station control device in the first exemplary embodiment of the present invention.

PREFERRED MODES

A transmission control device of the present invention may be exploited in the modes described below, wherein the transmission control device determines first group cells, each of which has the number of counted mobile stations larger than a predetermined value, and second group cells, each of which has the number of counted mobile stations smaller than the predetermined value and is the neighboring cell of a first group cell, and sends the same data.

The transmission control device of the present invention may set the point-to-multipoint transmission, as well as the point-to-point transmission, for the counted mobile stations of the second group cells.

The transmission control device of the present invention may further comprise a measuring unit that measures the reception quality of the mobile stations to which data is sent wherein the same data is sent to a mobile station, which belongs to a second group cell and has the measured reception quality that is low, using the point-to-point transmission.

As the reception quality of the mobile station, the reception quality achieved by diversity-combining the same data received by a plurality of cells of the first and second groups may be used.

The transmission control device of the present invention may further comprise a estimating unit that estimates resource consumption amounts required when the point-to-multipoint transmission is selected and required when the point-to-point transmission is selected respectively based on the number of mobile stations to which data is sent in each cell wherein the resource consumption amounts are compared and a cell, in which the point-to-multipoint transmission is better in terms of resource consumption, is set to the first group cell.

As the estimated resource consumption amounts, the estimated transmission power, with which the mobile stations in each cell can acquire a predetermined reception quality when each of the transmission modes is selected, may be used.

The estimated transmission power required when the point-to-multipoint transmission is selected is calculated in such a way that the lowest reception-quality mobile station in the cell can acquire a predetermined reception quality. In this case, the estimated transmission power is set as the actual transmission power of the cell.

According to one aspect of the present invention, there is provided a transmission control device that controls a plurality of base stations, each of which controls the plurality of cells, and functions as a base station control device.

Figure 1:
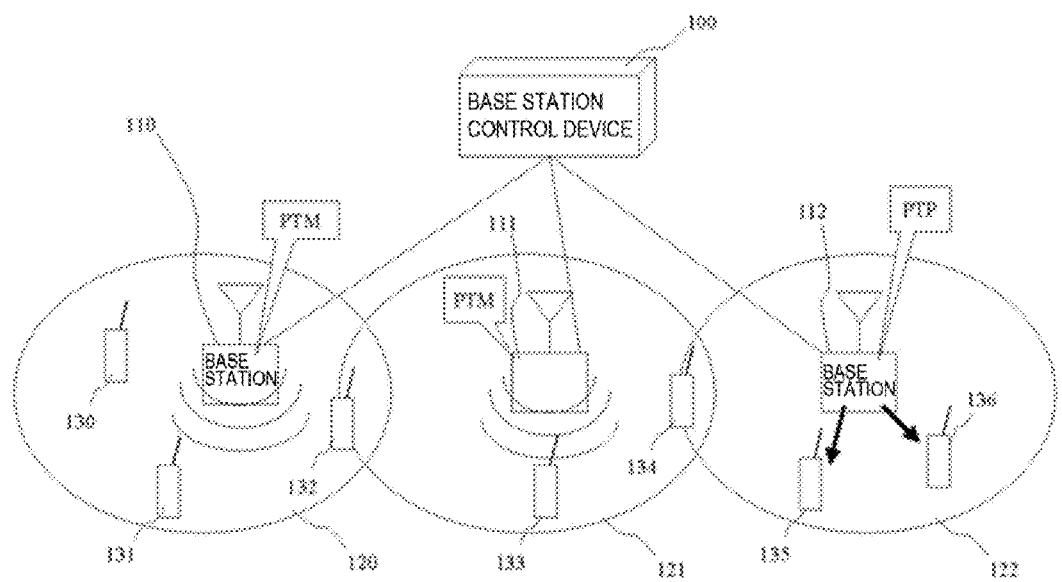
FIG. 1 is a diagram schematically showing the configuration of a wireless communication system to which the present invention is applicable.

Next, preferred exemplary embodiments of the present invention will be described more in detail below with reference to the drawings. First, the following describes a wireless communication system to which the present invention is applicable. FIG. 1 is a diagram schematically showing an example of a wireless communication system to which the present invention is applicable.

FIG. 1 shows a base station control device 100 that functions as a transmission control device, base stations 110-112, cells 120-122 under control of the base stations 110-112, and mobile stations 130-136.

The base station control device 100 is connected to the base stations 110-112. The base stations 110-112 and the mobile stations 130-136 can be connected via uplink and downlink wireless channels. The mobile stations 130-136 receive MBMS data with a good channel-quality cell as the sending cell (hereinafter called a serving cell). In the description of the exemplary embodiments below, the mobile stations 130-132 use the cell 120 as the servicing cell when the MBMS is started. Similarly, the mobile stations 133-134 use the cell 121 as the serving cell, and the mobile stations 135-136 use the cell 122 as the serving cell.

When MBMS is performed, the base station control device 100 sends a notification to all mobile stations via the base stations 110-112 to notify that MBMS will be performed and counts the number of MBMS reception users (number of users to which data is to be sent) using responses to the notification received from the mobile stations (counting). In this exemplary embodiment, it is assumed that all mobile stations wish to receive MBMS data. For example, in the example in FIG. 1, the number of MBMS reception users in cells 120, 121, and 122 under control of the base station control device 100 are 3, 2, and 2, respectively.

In the description of the exemplary embodiments of the present invention below, MBMS in a W-CDMA system is used as an example. A point to point (abbreviated "PTP" below) transmission channel is called DPCH and a point to multipoint (abbreviated "PTM" below) transmission channel is called SCCPCH.

First Exemplary Embodiment

Figure 2:
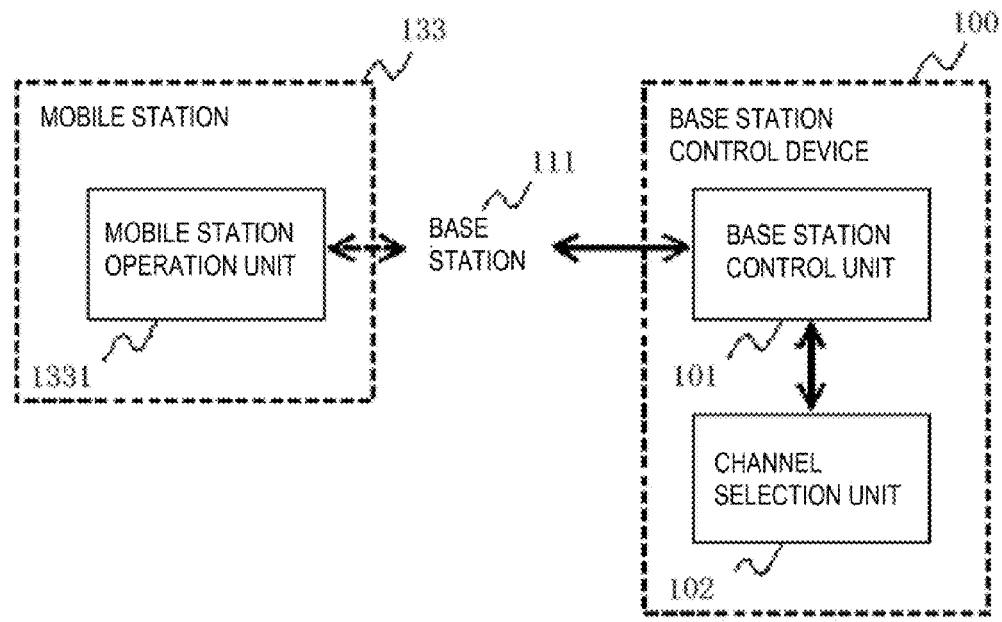
FIG. 2 is a diagram showing the basic configuration of a base station control device and a mobile station shown in FIG. 1.

A first exemplary embodiment of the present invention will be described. FIG. 2 is a diagram showing the basic configuration of the base station control device 100 and the mobile station 133 shown in FIG. 1. Although FIG. 2 shows, as an example, the configuration of the base station 111 and the mobile station 133 whose serving cell is the cell 121, the other base stations and mobile stations have the same configuration.

Referring to FIG. 2, the base station control device 100 comprises a base station control unit 101 and a channel selection unit 102.

The base station control unit 101 has the function similar to that of the base station control device used in a W-CDMA system. Because the configuration and operation of that function are known, the description is omitted here. In this exemplary embodiment, the base station control unit 101 has the function to notify that MBMS will be performed and, using responses from the mobile station, to count the number of MBMS reception users (counting). The function to count the number of MBMS reception users (counting) is a function that the base station control device of a W-CDMA system usually has.

The channel selection unit 102 has the function to group the cells using the counting result and according to the group determination rule, which will be described later, and to select the transmission mode (PTM/PTP) of MBMS. The information on the selected MBMS transmission mode (PTM/PTP) is sent to the base station 111 to allow it to start offering MBMS services to the mobile stations.

The mobile station 133 comprises a mobile station operation unit 1331. The mobile station operation unit 1331 functions as the means to receive MBMS data in one of the transmission modes, PTM transmission or PTP transmission, selected by the base station control device 100. The mobile station operation unit 1331 also functions as the means to receive the same data from multiple cells in the PTM transmission mode and perform diversity combining.

In addition to the function described above, the mobile station operation unit 1331 has the function similar to that of a mobile station used in a W-CDMA system. Because the configuration and operation of that function are known, the description is omitted here.

Next, the following describes the operation of this exemplary embodiment in detail with reference to the drawings. FIG. 3 is a flowchart showing the operation procedure, used by the base station control device 100 that performs MBMS, for counting the number of MBMS reception users (counting) and selecting the transmission mode of the cells based on the result of counting.

Referring to FIG. 3, before performing MBMS, the base station control unit 101 first checks the MBMS reception users using responses, which are returned from the mobile stations in response to an MBMS execution notification, and counts the number of MBMS reception users (N_count) (step S101).

Next, the channel selection unit 102 compares the number of MBMS reception users (N_count), counted by the base station control unit 101, with a pre-set threshold (N_thr) and selects the PTM transmission as the transmission mode of a cell where N_count>=N_thr (step S102). A cell for which the PTM transmission is selected because of the relation N_count>=N_thr is called a cell belonging to the first group. A mobile station that receives MBMS data from a cell belonging to the first group receives data in the PTM transmission mode.

Next, the channel selection unit 102 selects the PTM transmission as the transmission mode of a cell in which N_count<N_thr and which is the neighboring cell of a cell belonging to the first group (step S103). A cell, in which N_count<N_thr but for which the PTM transmission is selected because the neighboring cell is a cell belonging to the first group, is called a cell belonging to the second group. A mobile station that receives MBMS data from a cell belonging to the second group receives data in the PTM transmission mode. In addition, a mobile station that receives MBMS data from a cell belonging to one of the first group and second group can obtain a diversity combining gain by receiving the same data from the cell belonging to another group at the same time.

Finally, the channel selection unit 102 selects the PTP transmission as the transmission mode of cells that belong neither to the first group nor to the second group (step S104). Those cells are called cells belonging to the third group. A mobile station that receives MBMS data from a cell belonging to the third group receives data in the PTP transmission mode.

Figure 15:
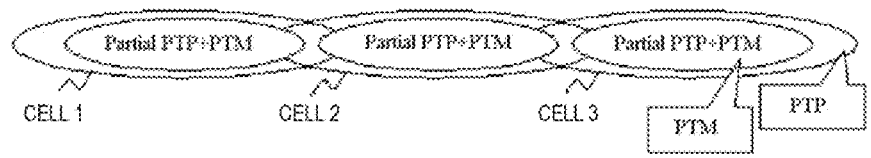
FIG. 15 is a diagram schematically showing the PTM transmission range and the PTP transmission range determined by a conventional technology (Patent Document 1).

As described above, this exemplary embodiment sends data in the PTM transmission mode not only in a cell in which there are many MBMS reception users but also in its neighboring cell as shown in FIG. 4 so that the combining processing can be performed, thus improving both the channel quality and the service coverage rate of MBMS. In addition, this exemplary embodiment consumes the amount of recourses smaller than that in a case where both the PTM transmission and the PTP transmission are used in all cells as described in Patent Document 1 (see FIG. 15).

Second Exemplary Embodiment

Next, a second exemplary embodiment of the present invention will be described in which the PTP transmission is also performed in a cell belonging to the second group in the first exemplary embodiment. Because this exemplary embodiment can be implemented by a configuration similar to that of the first exemplary embodiment, the following describes the configuration with focus on the different parts.

Figure 5:
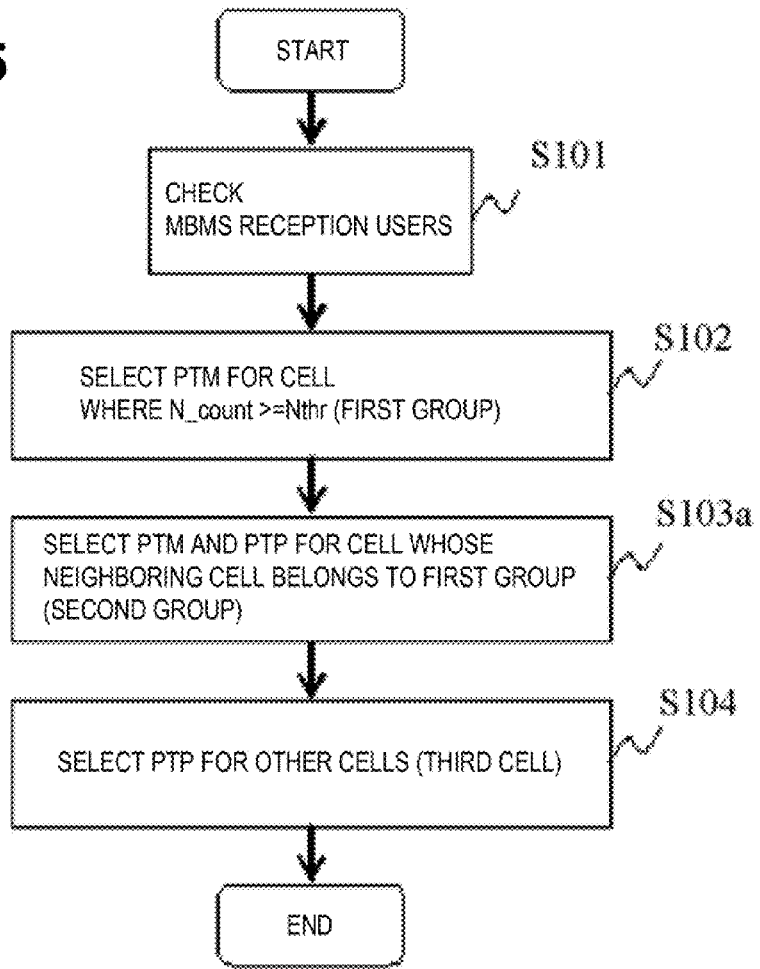
FIG. 5 is a flowchart showing the operation procedure performed by a base station control device in a second exemplary embodiment of the present invention to select the transmission modes of cells.

FIG. 5 is a flowchart showing the operation procedure used when a base station control device 100 in the second exemplary embodiment of the present invention counts the number of MBMS reception users (counting) and selects the transmission mode of the cells based on the counting result.

The difference between the FIG. 5 and FIG. 3, which shows the operation of the base station control device 100 in the first exemplary embodiment described above, is that a channel selection unit 102 selects not only the PTM transmission but also the PTP transmission as the transmission mode of a cell belonging to the second group (step S103a). A mobile station in this exemplary embodiment, which receives MBMS data from a cell belonging to the second group, receives data in the PTP transmission mode.

Figure 6:
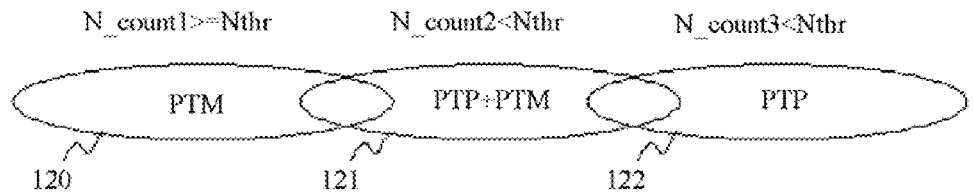
FIG. 6 is a diagram schematically showing cells for which the PTM transmission is selected, and a cell for which the PTP transmission is selected, by the base station control device in the second exemplary embodiment of the present invention.

The second exemplary embodiment of the present invention configured as described above also increases the combining gain in a cell belonging to the first group and improves the channel quality and the MBMS service coverage rate. In addition, this exemplary embodiment reduces the number of cells, in which both the PTM transmission and the PTP transmission are used at the same time, as compared with the method described in Patent Document 1 as shown in FIG. 6, thus minimizing the amount of resource consumption.

In the exemplary embodiment described above, a mobile station in a cell belonging to the second group receives MBMS data in the PTP transmission mode. However, if the channel quality of the PTM transmission is better than that of the PTP transmission, it is also possible to select the PTM transmission as the transmission mode for some mobile stations to obtain the combining effect as in the first exemplary embodiment described above.

Third Exemplary Embodiment

Next, a third exemplary embodiment of the present invention will be described in which the transmission mode is changed according to the channel quality measured by a mobile station belonging to the second group.

Figure 7:
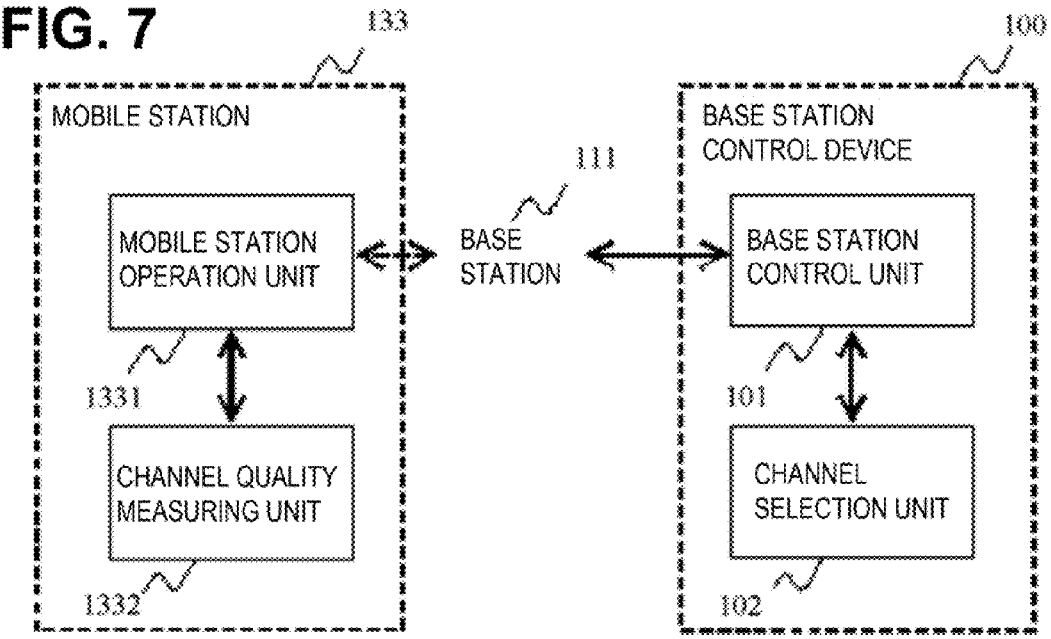
FIG. 7 is a diagram showing the basic configuration of a base station control device and a mobile station in a third exemplary embodiment of the present invention.

FIG. 7 is a diagram showing the basic configuration of a base station control device 100 and a mobile station 133 in the exemplary embodiment. Although FIG. 7 shows, as an example, the configuration of the base station 111 in FIG. 1 and the mobile station 133 whose serving cell is the cell 121, the other base stations and mobile stations have the same configuration.

Referring to FIG. 7, the mobile station 133 in this exemplary embodiment has the configuration similar to that of the first exemplary embodiment and further includes a channel quality measuring unit 1332. Because the other configuration is the same as that of the first exemplary embodiment described above, its description is omitted here.

The channel quality measuring unit 1332 has the function to measure the channel quality and to report the measured channel quality to the base station control device 100 via the base station at a predetermined time or in response to a request from the base station control device 100. In this exemplary embodiment, SIR (Signal to Interference Ratio; ratio of reception level of a desired wave to reception level of an interference wave) of CPICH (Common Pilot Channel) is used as the channel quality. In this exemplary embodiment, it is assumed that the transmission power of CPICH is equal among all cells.

A channel selection unit 102 of the base station control device 100 in this exemplary embodiment has the function to select the MBMS transmission mode using the counting result as well as the channel quality of a mobile station.

Figure 8:
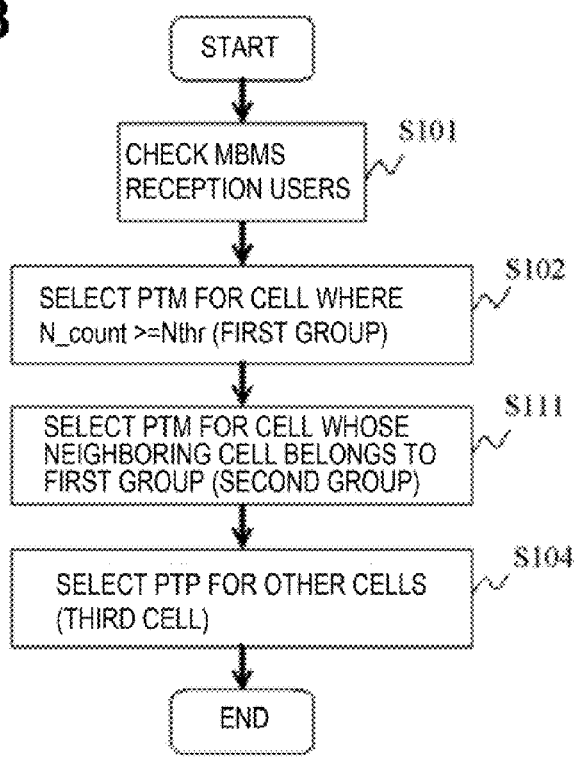
FIG. 8 is a flowchart showing the operation procedure performed by the base station control device in the third exemplary embodiment of the present invention to select the transmission modes of cells.

Next, the following describes the operation of this exemplary embodiment in detail with reference to the drawings. FIG. 8 is a flowchart showing the operation procedure, used by the base station control device 100 that performs MBMS, for counting the number of MBMS reception users (counting) and selecting the transmission mode of the cells based on the counting result. Referring to FIG. 8, this exemplary embodiment differs from the first exemplary embodiment described above in that step S103 in FIG. 3 is replaced by step S111.

That is, after determining the first group in step S102, the channel selection unit 102 of the base station control device 100 selects the PTM transmission as the transmission mode for a cell belonging to the second group which does not belong to a first group and whose neighboring cell is a cell belonging to the first group (step S111). A mobile station located in a cell belonging to the second group receives MBMS data in the PTM transmission mode.

Figure 9:
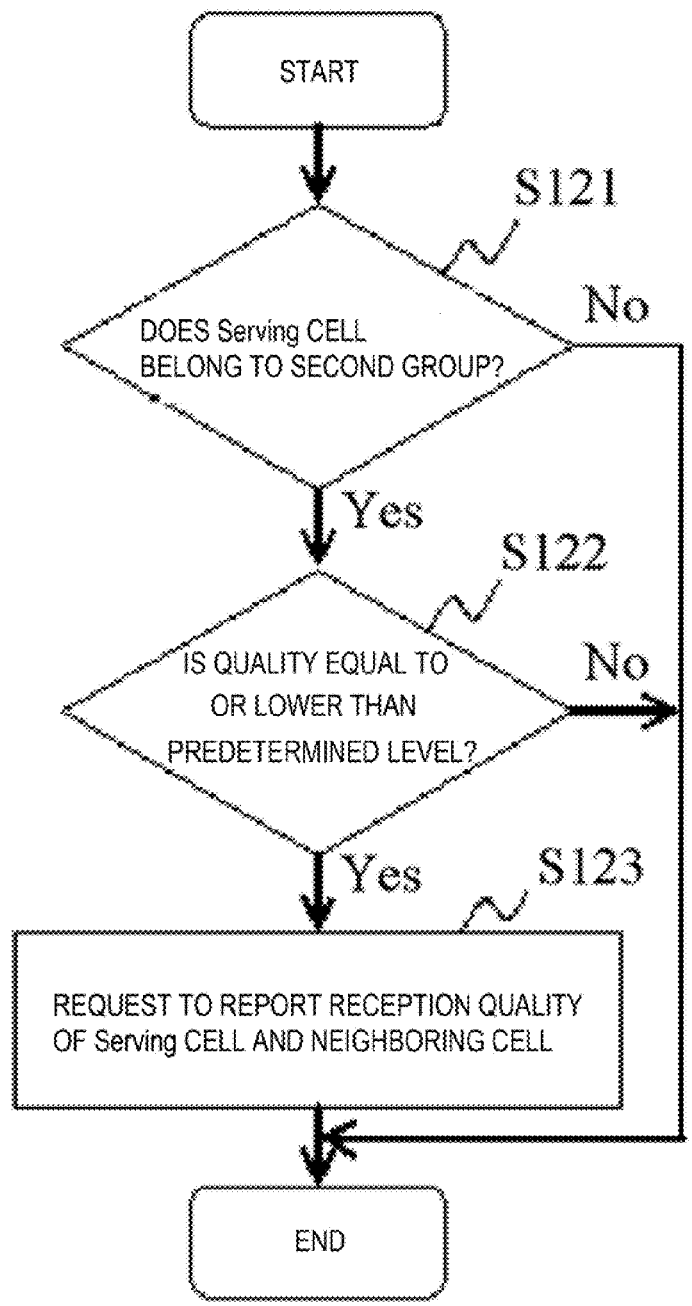
FIG. 9 is a flowchart showing the operation procedure performed by the base station control device in the third exemplary embodiment of the present invention to request mobile stations to report reception quality information.

FIG. 9 is a flowchart showing the operation procedure for improving the channel quality of a mobile station whose serving cell is a cell belonging to the second group and the channel quality of the serving cell is not good. The flowchart shows the operation procedure for requesting the measurement of the channel quality of the serving cell and its neighboring cell.

When a mobile station in any given cell reports the SIR of the serving cell at a predetermined time to the base station control unit 101, and if the serving cell of the mobile station is a cell belonging to the second group (PTM transmission) (Yes in step S121) and the SIR is equal to or lower than a predetermined level SIR_thr1 (Yes in step S122), the channel selection unit 102 requests the mobile station to report the channel quality of the serving cell and the neighboring cell (step S123).

Figure 10:
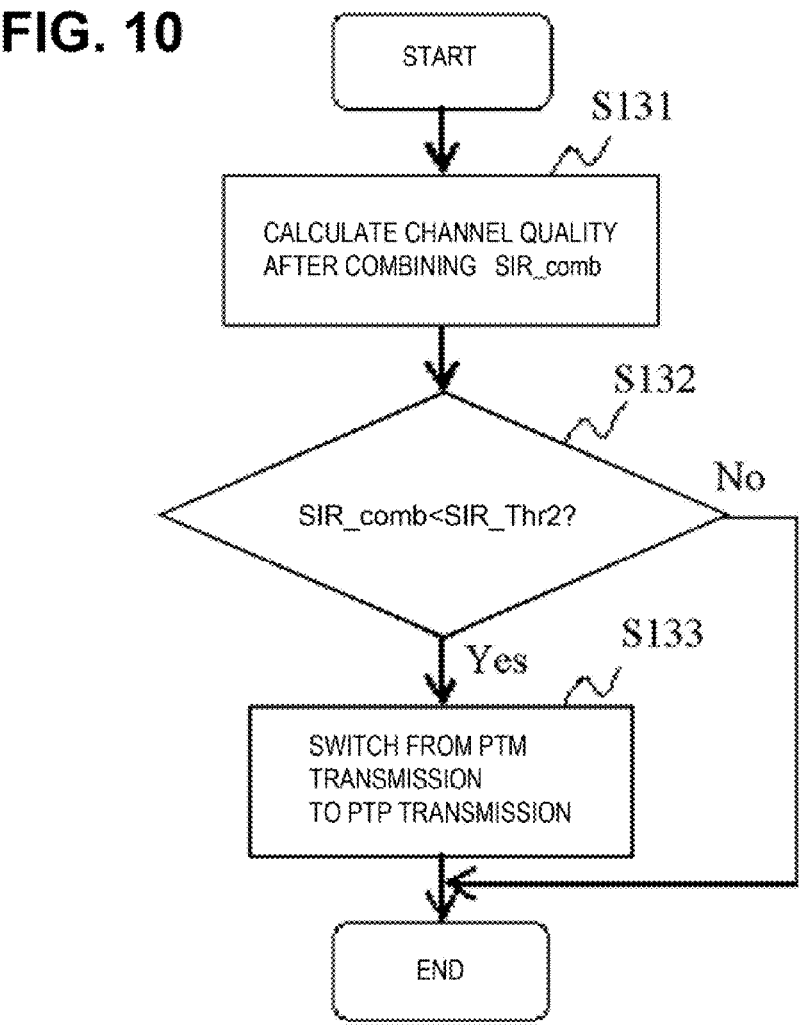
FIG. 10 is a flowchart showing the operation procedure performed by the base station control device in the third exemplary embodiment of the present invention to switch the transmission mode based on the reception quality information received from mobile stations.

FIG. 10 is a flowchart showing the operation procedure used by the base station control device 100, which has received a report on the channel quality, for switching the transmission mode based on the report on the channel quality from the mobile station.

Using [Expression 1] and [Expression 2] given below, the channel selection unit 102 of the base station control device 100 estimates SIR, which is after combining, of the PTM transmission channel of the mobile station that reported the channel quality (step S131).

$$\text{SIR\_ptm}_i = SIR_i \cdot \frac{Pptm_i}{Pcpich} \quad \text{[Expression 1]}$$

$$\text{SIR\_comb} = \sum^{NumComb} \text{SIR\_ptm}_i \quad \text{[Expression 2]}$$

[Expression 1] is an expression that estimates the SIR of the PTM transmission channel of cell i from SIR of CPICH ($SIR_i$), transmission power of PTM transmission channel ($Pptm_i$), and the transmission power of CPICH (Pcpich).

[Expression 2] is an expression that calculates the SIR after combining (SIR_comb), using the SIR of the PTM transmission channel of a predetermined cell calculated by [Expression 1], based on the maximum ratio combining method. NumComb is the number of cells, including the serving cell, for which combining is performed. The maximum value of NumComb is a pre-set constant MaxNumComb. The maximum (MaxNumbComb−1) number of cells that have quality equal to or higher than a predetermined level (not lower than at least SIR_ptm_thr) as compared with SIR_ptm of the serving cell are the cells for which combining is performed.

For example, if MaxNumComb=1, SIR_comb is equal to SIR_ptm of the serving cell. If MaxNumComb=2, SIR_ptm of the serving cell (SIR_ptm_s) is compared with SIR_ptm that is highest among neighboring cells (SIR_ptm_ns). If SIR_ptm_s−SIR_ptm_thr<=SIR_ptm_ns, NumComb is 2 and if SIR_ptm_s−SIR_ptm_thr>SIR_ptm_ns, NumComb is 1.

Next, the channel selection unit 102 checks if SIR after combining (SIR_comb) is lower than a predetermined level (SIR_thr2) (step S132). If SIR after combining (SIR_comb) is lower than the predetermined level, the channel selection unit 102 judges that the channel quality of the PTM transmission is low and switches the transmission mode of the mobile station, which reported the channel quality, to the PTP transmission (step S133). The mobile station, which has the transmission mode switched to the PTP transmission, receives MBMS data in the PTP transmission mode.

Figure 11:
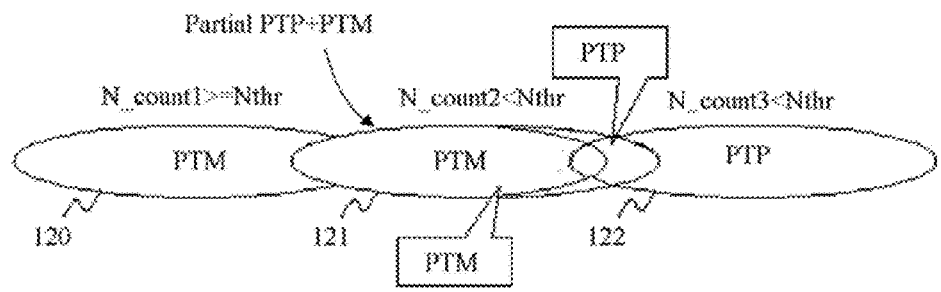
FIG. 11 is a diagram schematically showing a cell for which the PTM transmission is selected, a cell for which both PTP transmission and PTM transmission are selected, and a cell for which the PTP transmission is selected in the third exemplary embodiment of the present invention.

In this exemplary embodiment, if a mobile station is in a cell where the PTM transmission is performed because combining with the neighboring cell is performed as shown in the cell image diagram in FIG. 11 (cell belonging to the second group) and if the channel quality of the PTM transmission is low, the transmission mode of the mobile station is switched to the PTP transmission as described above. Therefore, as compared with the second exemplary embodiment described above, this exemplary embodiment reduces the number of mobile stations that receive data in the PTP transmission mode, thus reducing the amount of resource consumption.

Concrete Example of Third Exemplary Embodiment

The following describes more in detail the third exemplary embodiment of the present invention with reference again to the flowcharts in FIG. 8 to FIG. 10. In the description below, let the threshold for selecting the transmission mode be N_thr=3. Assume that, in step S101 in FIG. 8, the base station control device 100 measures the number of MBMS reception users as follows. # in N_count# corresponds to the numeral assigned to the cells in FIG. 1.

N_count120=3, N_count121=2, N_count122=2

Only the cell 120 satisfies N_count>=Nthr=3. In step S102 in FIG. 8, the channel selection unit 102 selects the PTM transmission as the transmission mode of the cell 120.

The cell 121 is the neighboring cell of the cell 120 belonging to the first group. In step S111 in FIG. 8, the channel selection unit 102 selects the PTM transmission as the transmission mode of the cell 121.

In step S104 in FIG. 8, the channel selection unit 102 selects the PTP transmission as the transmission mode of the other cell 122 (step S104).

Next, the following describes the case, shown in FIG. 9, in which the base station control device 100 requests a mobile station to measure the channel quality. Assume that the threshold, by which the base station control device 100 requests the measurement of the channel quality of the serving cell and its neighboring cell, is SIR_thr1=−3.0 dB. Also assume that, in step S121 in FIG. 9, the mobile station 134 whose serving cell is the cell 121 reports at a predetermine time that the SIR of CPICH of the serving cell is −6.0 dB.

The channel selection unit 102 judges that the serving cell (cell 121) of the mobile station 134 belongs to the second group (Yes in step S121) and that SIR=−6.0 db is also lower than the threshold SIR_thr1=−3.0 (Yes in step S122). At this time, the channel selection unit 102 requests the mobile station 134 to report the channel quality of the serving cell and the neighboring cell (step S123).

Next, the following describes the case, shown in FIG. 10, in which the base station control device 100 switches the transmission mode of a mobile station. Assume that the mobile station 134 reports the channel quality of the serving cell (cell 121) and the neighboring cells (cells 120 and 122).

The parameters are as follows.

SIR_ptm_thr=10.0 dB, SIR_thr2=−3.0 dB, Pcpich=2W, MaxNumComb=3

Cell 120:SIR120=−9.0 dB, P_ptm120=2W
Cell 121:SIR121=−6.0 dB, P_ptm121=2W
Cell 122:SIR122=−7.0 dB In step S131, the channel selection unit 102 estimates SIR after combining (SIR_comb) of the PTM transmission channel of the mobile station 134. The PTP transmission is performed in the cell 122 that is one of the neighboring cells, and SIR_ptm of the cell 120 is not lower than SIR_ptm of the serving cell (cell 121) by at least SIR_ptm_thr.

At this time, SIR_ptm121[dB]−SIR_ptm_thr[dB]=−6.0−10=−16.0<SIR_ptm120[dB]=−9.0

Therefore, the channel selection unit 102 combines SIR_ptm of the cell 121 and that of the cell 120 and performs the calculation as follows.

$$SIR\_ptm120[True\ value]=SIR120*Pptm120/Pcpich=10^{\wedge}(-9.0/10)*2/2=0.126$$

$$SIR\_ptm121[True\ value]=SIR121*Pptm121/Pcpich=10^{\wedge}(-6.0/10)*2/2=0.251$$

$$SIR\_comb[True\ value]=SIR\_ptm120+SIR\_ptm121=0.126+0.251=0.377$$

$$SIR\_comb[dB]=10*\log(SIR\_comb[True\ value])=10*\log(0.377)=-4.2\ dB$$

In the example described above, because the estimated SIR_comb=−4.2 dB is higher than SIR=−6.0 dB but lower than the threshold SIR_thr2=−3.0 dB (Yes in step S132), the channel selection unit 102 judges that channel quality of the PTM transmission is substantially low and switches the mode of transmission to the mobile station 134 to the PTP transmission (step S133). After switching, the mobile station 134 receives MBMS data in the PTP transmission mode.

Fourth Exemplary Embodiment

Next, a fourth exemplary embodiment of the present invention will be described below in which the base station control device 100 estimates the transmission power required for the PTM transmission and for the PTP transmission and, based on the result, selects the transmission mode.

Figure 12:
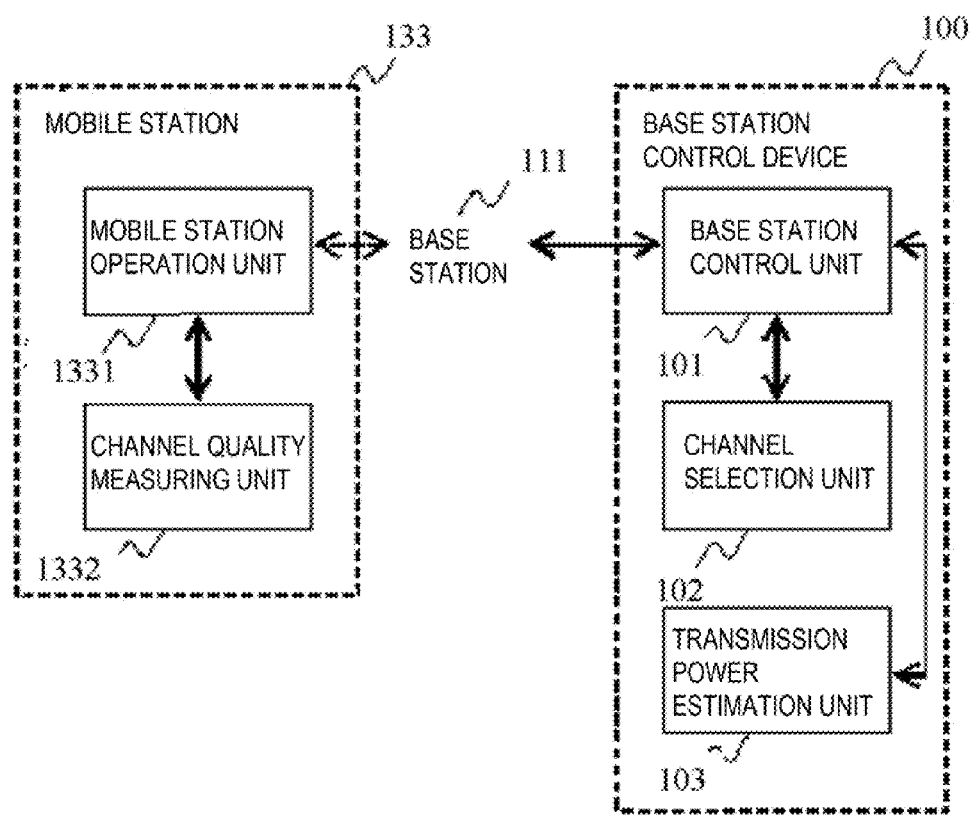
FIG. 12 is a diagram showing the basic configuration of a base station control device and a mobile station in a fourth exemplary embodiment of the present invention.

FIG. 12 is a diagram showing the basic configuration of a base station control device 100 and a mobile station 133 in this exemplary embodiment. Although FIG. 12 shows, as an example, the configuration of the base station 111 shown in FIG. 1 and the mobile station 133 whose serving cell is the cell 121, the other base stations and mobile stations have the same configuration.

Referring to FIG. 12, the base station control device 100 in this exemplary embodiment has the configuration of the base station control device 100 in the third exemplary embodiment described above and further comprises a transmission power estimation unit 103. Because the other configuration is the same as that of the third exemplary embodiment described above, its description is omitted here.

The transmission power estimation unit 103 has the function to estimate the transmission power of the MBMS transmission channel using the channel quality reported by a mobile station and the function to specify the transmission power of the PTM transmission channel of each cell.

Figure 13:
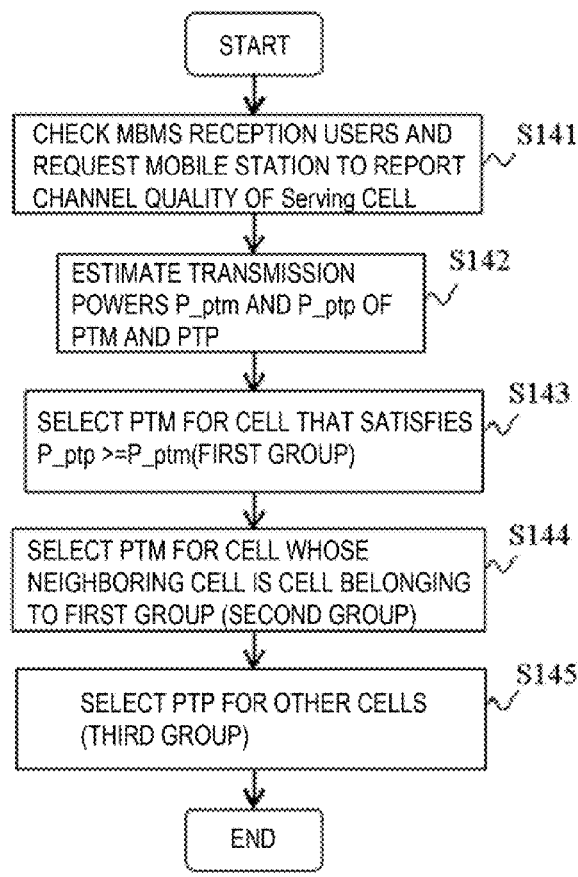
FIG. 13 is a flowchart showing the operation procedure performed by the base station control device in the fourth exemplary embodiment of the present invention to select the transmission modes of cells.
Figure 14:
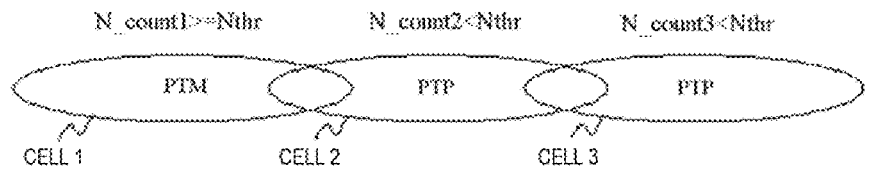
FIG. 14 is a diagram schematically showing a cell for which the PTM transmission is selected, and cells for which the PTP transmission is selected, by a conventional technology (first conventional method).

Next, the following describes the operation of this exemplary embodiment in detail with reference to the drawings. FIG. 13 is a flowchart showing the operation procedure, used by the base station control device 100 that performs MBMS, for estimating the transmission power of the MBMS transmission channel and, based on the result, selecting the transmission mode of each cell and specifying the transmission power of the PTM transmission channel.

Referring to FIG. 13, the base station control unit 101 counts the number of MBMS reception users (counting) when performing MBMS and, at the same time, requests a mobile station (MBMS reception user) to report the channel quality of a cell that is the serving cell (step S141).

Next, the transmission power estimation unit 103 estimates the transmission power of the PTM transmission (P_ptm) and the transmission power of the PTP transmission (P_ptp) from the channel quality of each mobile station (step S142).

In this case, P_ptm is the transmission power with which a mobile station with the worst (lowest) channel quality can receive data in a predetermined quality. P_ptp is estimated by estimating the transmission power, with which each mobile station can receive data in a predetermined quality, from the channel quality and by calculating the total.

Next, the channel selection unit 102 determines a cell, which satisfies P_ptp>=P_ptm, as a cell belonging to the first group and selects the PTM transmission as the transmission mode (step S143). And, via the base station control unit 101, the channel selection unit 102 specifies the transmission power P_ptm of the PTM transmission of the cells, which belong to this group, for the base stations controlling those cells. A mobile station that receives MBMS data from a cell belonging to this first group receives data in the PTM transmission mode.

The channel selection unit 102 determines a cell, which satisfy P_ptp<P_ptm and whose neighboring cell is a cell belonging to the first group, as a cell belonging to the second cell and selects the PTM transmission as the transmission mode (step S144). And, via the base station control unit 101, the channel selection unit 102 specifies the transmission power P_ptm of the PTM transmission of the cells, which belong to this group, for the base stations controlling those cells. A mobile station that receives MBMS data from a cell belonging to this first group receives data in the PTM transmission mode. A mobile station that receives MBMS data from a cell belonging to this second group receives the MBMS data in the PTM transmission mode and, in addition, receives the same data from a cell belonging to the first group, in which the PTM transmission is performed, and so a diversity combining gain is achieved.

Finally, the channel selection unit 102 determines the cells, belonging neither to the first group nor to the second group, as cells belonging to the third group and selects the PTP transmission as the transmission mode (step S145). A mobile station that receives MBMS data from the third group receives data in the PTP transmission mode.

The other operation is the same as that of the third exemplary embodiment described above and so the description is omitted here. In this exemplary embodiment, it is possible to select the transmission mode of each cell based not only on the number of MBMS reception users but also on the result of the estimation of the transmission power of the MBMS transmission channel. It is also possible to specify an adequate transmission power for the base station, which controls a cell for which the PTM transmission is selected, with consideration for the worst channel quality of a mobile station.

While the preferred exemplary embodiments of the present invention have been described above, it is to be understood that the present invention is not limited to the exemplary embodiments described above but may be changed, replaced, or adjusted without departing the basic technological concept of the present invention.

For example, though SIR is used as the reception quality (channel quality) of a mobile station in the third exemplary embodiment described above, it is of course possible to use other quality indexes.

In the fourth exemplary embodiment described above, the transmission power estimation unit 103 estimates a transmission mode that requires less transmission power, it is also possible to estimate and compare the resource consumption amounts in each transmission mode considering other conditions for selecting a transmission mode that requires still smaller resource consumption amounts.

In the following, preferred modes are summarized.

Mode 1

Refer to the transmission control device of the first aspect.

Mode 2

The transmission control device as defined by mode 1 wherein the same data is sent to the counted mobile stations of the second group cells using the point-to-point transmission.

Mode 3

The transmission control device as defined by mode 1 or 2, further comprising means that measures a reception quality of the mobile stations to which data is sent wherein the same data is sent to a mobile station, which belongs to a second group cell and has the measured reception quality that is low, using the point-to-point transmission.

Mode 4

The transmission control device as defined by mode 3 wherein the reception quality of the mobile station is a reception quality achieved by diversity-combining the same data received by a plurality of cells belonging to the first and second groups.

Mode 5

The transmission control device as defined by one of modes 1-4, further comprising means that estimates resource consumption amounts required when the point-to-multipoint transmission is selected and required when the point-to-point transmission is selected respectively based on the number of mobile stations to which data is sent in each cell wherein the resource consumption amounts are compared and a cell, in which the point-to-multipoint transmission is better in terms of resource consumption, is set to the first group cell.

Mode 6

The transmission control device as defined by mode 5 wherein the estimated resource consumption amounts are an estimated transmission power with which the mobile stations in each cell can acquire a predetermined reception quality when each of the transmission modes is selected.

Mode 7

The transmission control device as defined by mode 6 wherein the estimated transmission power required when the point-to-multipoint transmission is selected is calculated in such a way that a lowest reception-quality mobile station in the cell can acquire a predetermined reception quality and the estimated transmission power is set as an actual transmission power of the cell.

Mode 8

The transmission control device as defined by one of modes 1-7 wherein said transmission control device controls a plurality of base stations, each of which controls the plurality of cells, and functions as a base station control device.

Mode 9

Refer to the transmission control method of the third aspect.

Mode 10

The transmission control method as defined by mode 9 wherein said transmission control device sends the same data to the counted mobile stations of the second group cells using the point-to-point transmission.

Mode 11

The transmission control method as defined by mode 9 or 10, further comprising the steps of measuring, by said transmission control device, a reception quality of the mobile stations to which data is sent; and sending, by said transmission control device, the same data to a mobile station, which belongs to a second group cell and has the measured reception quality that is low, using the point-to-point transmission.

Mode 12

The transmission control method as defined by mode 11 wherein the reception quality of the mobile station is a reception quality achieved by diversity-combining the same data received by a plurality of cells belonging to the first and second groups.

Mode 13

The transmission control method as defined by one of modes 9-12, further comprising the steps, by said transmission control device, of estimating resource consumption amounts required when the point-to-multipoint transmission is selected and required when the point-to-point transmission is selected respectively based on the number of mobile stations to which data is sent in each cell; and comparing the resource consumption amounts and setting a cell, in which the point-to-multipoint transmission is better in terms of resource consumption, to the first group cell.

Mode 14

The transmission control method as defined by mode 13 wherein the estimated resource consumption amounts are an estimated transmission power with which the mobile stations in each cell can acquire a predetermined reception quality when each of the transmission modes is selected.

Mode 15

The transmission control method as defined by mode 14 wherein the estimated transmission power required when the point-to-multipoint transmission is selected is calculated in such a way that a lowest reception-quality mobile station in the cell can acquire a predetermined reception quality and the estimated transmission power is set as an actual transmission power of the cell. [0100]

The disclosures of Patent Documents given above are hereby incorporated by reference into this specification. While the present invention has been described with reference to the exemplary embodiments above, it is to be understood that the present invention is not limited to the configuration of the exemplary embodiments above and that modifications and changes that may be made by those skilled in the art within the scope of the present invention are included.

What is claimed is:

1. A transmission control device comprising:
 a counting unit that counts a number of mobile stations to which data is sent in each cell;
 a selecting unit that determines cells belonging to a first group and cells belonging to a second group, selects a point-to-multipoint transmission for the cells belonging to the first and second groups, and selects a point-to-point transmission for other cells, each of said first group cells having a number of counted mobile stations larger than a predetermined value, each of said second group cells having a number of counted mobile stations smaller than the predetermined value and being a neighboring cell of a cell belonging to said first group; and
 a sending unit that sends the same data to a plurality of mobile stations located in each of the cells using a transmission mode selected for each of the cells.

2. The transmission control device as defined by claim 1, wherein the same data is sent to the counted mobile stations of the second group cells using the point-to-point transmission.

3. The transmission control device as defined by claim 1, further comprising:
a measuring unit that measures a reception quality of the mobile stations to which data is sent, wherein
the same data is sent to a mobile station, which belongs to a second group cell and has the measured reception quality that is low, using the point-to-point transmission.

4. The transmission control device as defined by claim 3, wherein the reception quality of the mobile station is a reception quality achieved by diversity-combining the same data received by a plurality of cells belonging to the first and second groups.

5. The transmission control device as defined by claim 1, further comprising:
a estimating unit that estimates resource consumption amounts required when the point-to-multipoint transmission is selected and required when the point-to-point transmission is selected respectively based on the number of mobile stations to which data is sent in each cell, wherein
the resource consumption amounts are compared and a cell, in which the point-to-multipoint transmission is better in terms of resource consumption, is set to the first group cell.

6. The transmission control device as defined by claim 5, wherein
the estimated resource consumption amounts are an estimated transmission power with which the mobile station(s) in each cell can acquire a predetermined reception quality when each of the transmission modes is selected.

7. The transmission control device as defined by claim 6, wherein
the estimated transmission power required when the point-to-multipoint transmission is selected is calculated in such a way that a lowest reception-quality mobile station in the cell can acquire a predetermined reception quality and the estimated transmission power is set as an actual transmission power of the cell.

8. The transmission control device as defined by claim 1 wherein said transmission control device controls a plurality of base stations, each of which controls the plurality of cells, and functions as a base station control device.

9. A transmission control method comprising the steps of:
counting, by a transmission control device provided in a wireless communication system, a number of mobile stations to which data is sent in each cell;
determining, by said transmission control device, cells belonging to a first group and cells belonging to a second group, selecting a point-to-multipoint transmission for the cells belonging to the first and second groups, and selecting a point-to-point transmission for other cells, each of said first group cells having a number of counted mobile stations larger than a predetermined value, each of said second group cells having a number of counted mobile stations smaller than the predetermined value and being a neighboring cell of a cell belonging to said first group; and
sending, by said transmission control device, the same data to a plurality of mobile stations located in each of the cells using a transmission mode selected for each of the cells.

10. The transmission control method as defined by claim 9, wherein said transmission control device sends the same data to the counted mobile station(s) of the second group cells using the point-to-point transmission.

11. The transmission control method as defined by claim 9, further comprising the steps of:
measuring, by said transmission control device, a reception quality of the mobile station(s) to which data is sent; and
sending, by said transmission control device, the same data to a mobile station, which belongs to a second group cell and has the measured reception quality that is low, using the point-to-point transmission.

12. The transmission control method as defined by claim 11, wherein the reception quality of the mobile station(s) is a reception quality achieved by diversity-combining the same data received by a plurality of cells belonging to the first and second groups.

13. The transmission control method as defined by claim 9, further comprising the steps, by said transmission control device, of:
estimating resource consumption amounts required when the point-to-multipoint transmission is selected and required when the point-to-point transmission is selected respectively based on the number of mobile stations to which data is sent in each cell; and
comparing the resource consumption amounts and setting a cell, in which the point-to-multipoint transmission is better in terms of resource consumption, to the first group cell.

14. The transmission control method as defined by claim 13, wherein
the estimated resource consumption amounts are an estimated transmission power with which the mobile stations in each cell can acquire a predetermined reception quality when each of the transmission modes is selected.

15. The transmission control method as defined by claim 14, wherein
the estimated transmission power required when the point-to-multipoint transmission is selected is calculated in such a way that a lowest reception-quality mobile station in the cell can acquire a predetermined reception quality and the estimated transmission power is set as an actual transmission power of the cell.

* * * * *